J. D. TAYLOR.
TRUCK.
APPLICATION FILED NOV. 16, 1909.

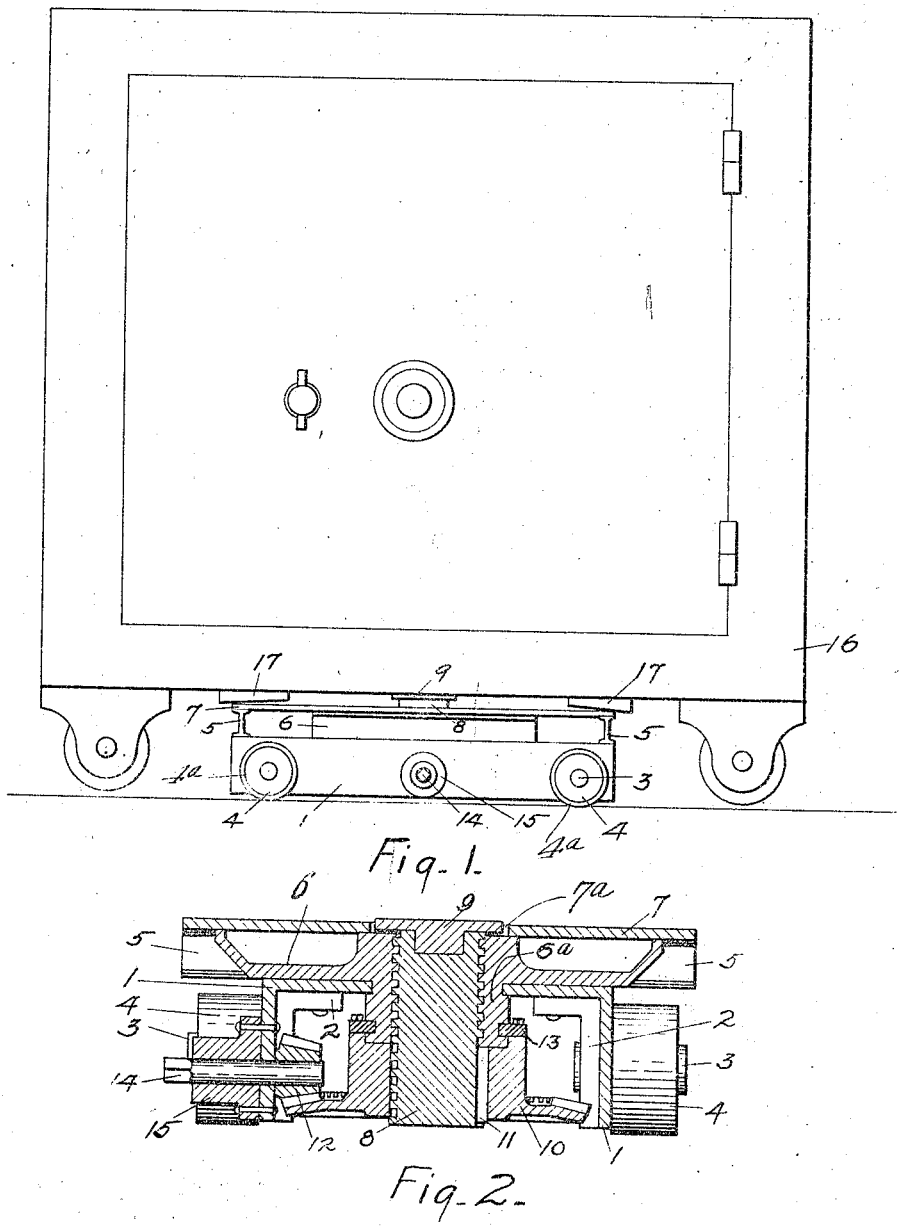

966,620.

Patented Aug. 9, 1910.
2 SHEETS—SHEET 2.

Witnesses:

James D. Taylor
Inventor
Attorneys

UNITED STATES PATENT OFFICE.

JAMES D. TAYLOR, OF PORTLAND, OREGON.

TRUCK.

966,620.      Specification of Letters Patent.      Patented Aug. 9, 1910.

Application filed November 16, 1909. Serial No. 528,341.

*To all whom it may concern:*

Be it known that I, JAMES D. TAYLOR, a citizen of the United States, residing at Portland, in the county of Multnomah and State of Oregon, have invented a new and useful Truck, of which the following is a specification.

This invention relates to trucks for elevating and moving heavy articles, the truck which is the subject of the present invention being designed more particularly for moving safes.

It is the object of the invention to provide a truck for this purpose, which is small and compact in form so that it can slide under the safe, and also to provide a structure by which a truck of great strength is had so that it can successfully withstand the strain of the heavy load which is placed upon it.

A further object is to provide the elevating device of the truck with a turn table, so that the position of the safe may be changed when on the truck.

The invention also has for its object to provide an easily operated elevating means, together with other novel and improved structural details to be hereinafter described and claimed.

Figure 3:
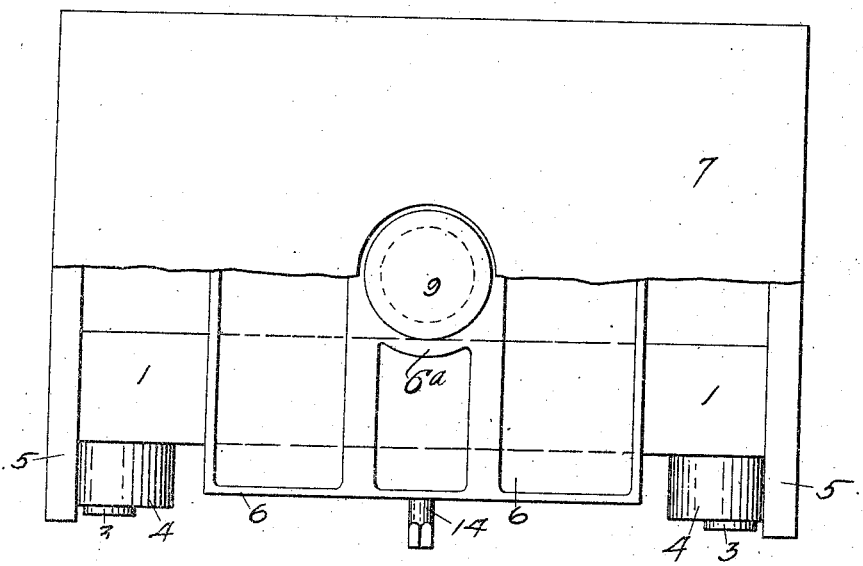
Figure 4:
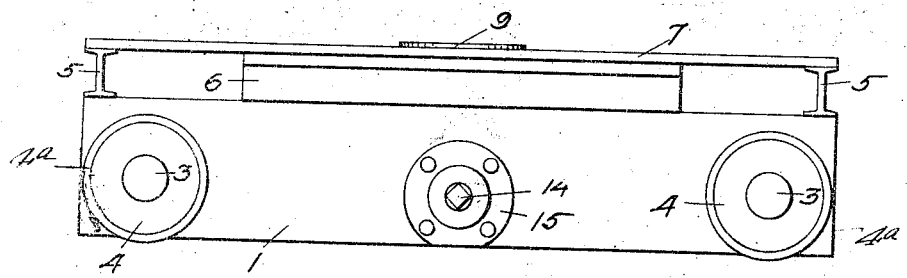

In the accompanying drawings, Figure 1 is a front elevation of the truck showing the same in use. Fig. 2 is an enlarged transverse section of the truck. Fig. 3 is a plan view partly broken away. Fig. 4 is an enlarged front elevation.

The truck frame comprises a pair of spaced parallel extending angle beams 1, and a plate 6 mounted on the horizontal portions of said beams. The angle beams are braced by angles 2, which carry the axles 3 of the truck wheels 4, said axles being carried by the perpendicularly extending portions of the angle beams. The truck wheels may be provided with a rubber tire 4ª. The plate 6 has a central enlargement 6ª provided with a screw-threaded opening in which the elevating screw 8 is threaded. The screw is adapted to travel up and down in this opening, and carries at its upper end a turn table 9 on which the load is placed.

The angle beams 1 carry at their ends I-beams 5 and the latter support a stationary platform 7 having an opening 7ª through which the elevating screw and the turn table loosely pass.

The means for rotating the elevating screw 8 comprise a bevel gear 10, and a pinion 12, in mesh therewith. The gear 10 is secured to the screw by a spline 11, so that it may rotate the screw in the threaded opening of the enlarged portion 6ª of the plate 6. The screw is adapted to travel up and down in said opening when the gear 10 is rotated. The enlargement 6ª extends below the plate 6, and is shaped to form a support on which the gear 10 is mounted for rotation. The upper end of the gear carries a ring 13 which seats in a groove made in the outer surface of the enlargement, and which prevents the gear from traveling with the screw.

The pinion 12 is mounted on a shaft 14 passing through an opening in one of the beams 1, and journaled in a bearing 15 mounted on the outer face of said beam. The shaft projects a short distance from this bearing, and the projecting end is squared for connection of an operating device, which may be a ratchet lever.

In use, the truck is rolled under the safe 16 to be moved, and the elevating screw 8 is operated to raise the safe off the floor, after which it may be carried by the truck to the place desired. Between the bottom of the safe, and the top of the platform 7 are placed wedges 17 to balance the safe on the truck. The safe is supported directly on the turn table 9, which enables it to be swung around while on the truck.

By the structure herein described, a truck is had which is strong and durable, and which therefore can successfully withstand the strain placed upon it by the heavy load which it carries, the elevating screw is easy to operate, and the invention therefore effectually serves the purpose for which it is designed.

What is claimed is:

1. A truck comprising a wheeled frame having a threaded opening, a traveling elevating screw working in said opening, a platform mounted on the frame, and having an opening through which the screw is adapted to pass, and means for operating the screw.

2. A truck comprising a wheeled frame having a threaded opening, a traveling elevating screw working in said opening, a platform mounted on the frame, and having an opening through which the screw is adapted to pass, means for operating the screw, and a turn-table mounted on the working end of the screw.

3. A truck comprising a frame consisting of side beams, a plate mounted thereon, and formed with a central enlargement having a threaded opening, and a stationary platform mounted on said plate, an elevating screw threaded through the opening, and means for operating the screw, the aforesaid platform having an opening through which the screw is adapted to pass.

4. A truck comprising a frame consisting of side members composed of spaced parallel angle beams, and a plate mounted on the horizontally disposed portions of said beams, said plate being formed with a central enlargement having a threaded opening, wheels carried by the perpendicular portions of the angle beams, an elevating screw threaded through the opening, means for operating said screw, beams extending across the ends of the side members, and a stationary platform supported on said beams, said platform having an opening through which the screw is adapted to pass.

In testimony that I claim the foregoing as my own, I have hereto affixed my signature in the presence of two witnesses.

JAMES D. TAYLOR.

Witnesses:
JOHN MORRISSEY,
ROBERT E. HITCH.